United States Patent [19]

Vogel

[11] 4,392,956
[45] Jul. 12, 1983

[54] ENCAPSULATED FRAME TYPE FILTER PRESS

[75] Inventor: George P. Vogel, Kingston, N.Y.
[73] Assignee: Stavo Industries, Inc., Kingston, N.Y.
[21] Appl. No.: 301,219
[22] Filed: Sep. 11, 1981
[51] Int. Cl.³ .............................................. B01D 25/14
[52] U.S. Cl. .................................... 210/224; 210/244; 100/56; 100/59
[58] Field of Search ............... 210/224, 225, 226, 227, 210/244, 245, 246; 100/56, 58, 59

[56] References Cited

U.S. PATENT DOCUMENTS

| | | | |
|---|---|---|---|
| 1,852,371 | 4/1932 | Raymond et al. | 210/226 |
| 1,860,937 | 5/1932 | McCaskell | 210/224 |
| 3,272,296 | 9/1966 | Fredholm | 210/146 |
| 4,081,380 | 3/1978 | Johnson | 210/225 |

*Primary Examiner*—David R. Sadowski
*Attorney, Agent, or Firm*—Harvey B. Jacobson

[57] ABSTRACT

An upwardly opening tank including interconnected opposite side and end walls and a first stationary filter head therein is provided. A second head is mounted in the tank and is shiftable toward and away from the stationary head for clamping a plurality of filter frames between the heads. The stationary head includes inlet and outlet passages for inlet and outlet flow of fluid to be filtered and a downwardly opening cover is provided for the tank including interconnected opposite side and end walls. A lift frame swingably supports the cover from the tank for forward and downward swinging of the cover into closed position and upward and rearward swinging of the cover toward an open position with the cover disposed in a forwardly and downwardly opening attitude. The upper marginal edges of the tank include seal structure for forming at least a generally fluid-tight seal with the lower marginal edges of the cover when the cover is closed, the end walls of the tank include trapezoidal-shaped upper extensions, the end walls of the cover include complementary similar shape and size downwardly opening recesses in which the extensions are received when the cover is closed and the cover is supported for slight oscillation about a horizontal axis extending longitudinally of the cover relative to the lift frame.

8 Claims, 8 Drawing Figures

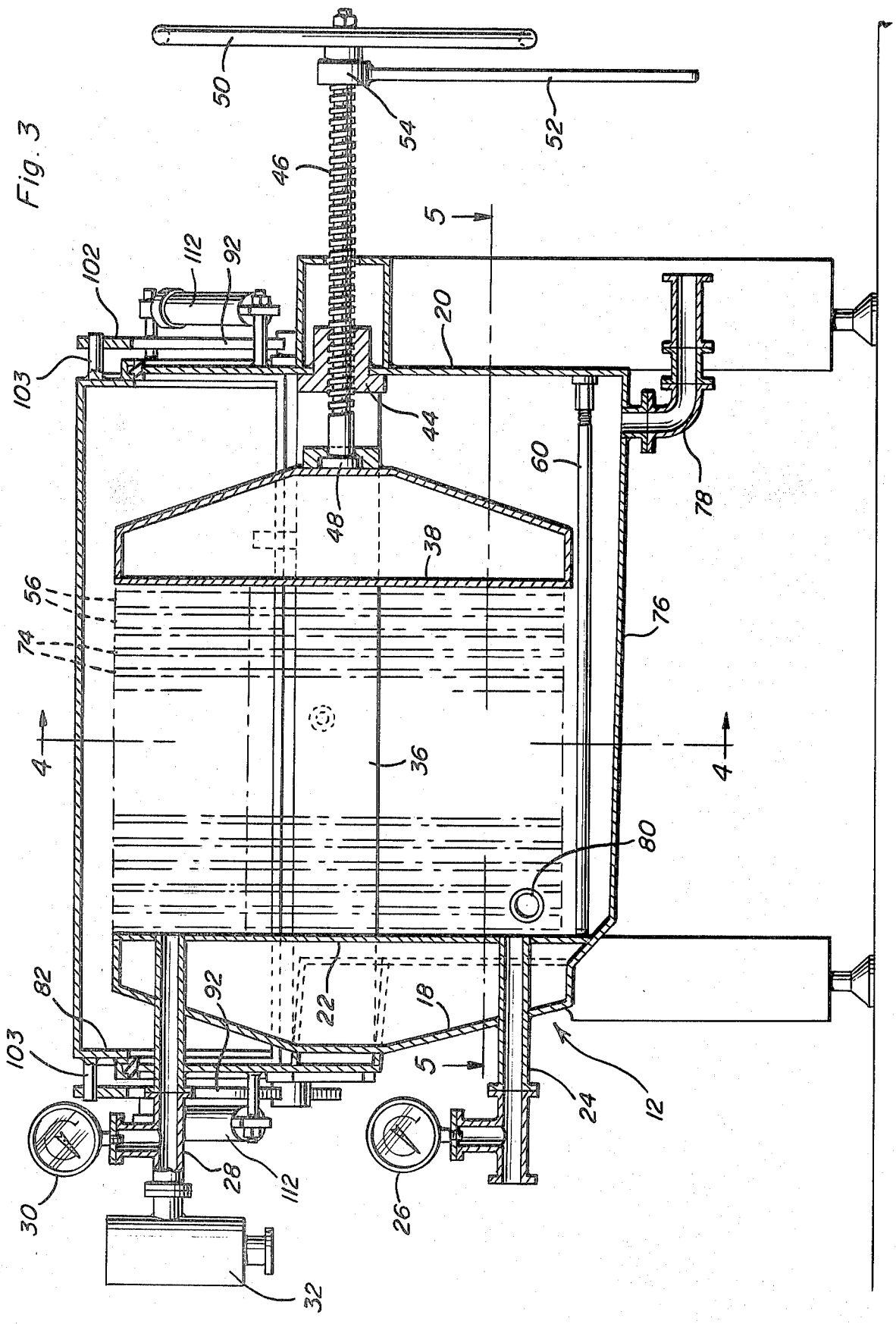

ENCAPSULATED FRAME TYPE FILTER PRESS

BACKGROUND OF THE INVENTION

Heretofore encapsulated disc filter constructions have been constructed wherein horizontal disc filters are stacked to form a vertical column of filter discs and these filter discs, after being assembled, are lowered into an upstanding container in which they are subsequently mounted to form a high capacity filter construction. However, these stacks of filters may be of considerable height and represent a considerable load, therefore requiring being handled by overhead hoist mechanisms. Accordingly, the task of replacing disc filters is time consuming and requires the placement of a suitable hoist adjacent the container for the disc filters.

Although horizontal filter constructions including a filter assembly of a plurality of side-by-side upstanding filter discs heretofore have been provided, these previously known forms of filter constructions are without enclosures and may therefore not be utilized in conjunction with certain fluids from which drippings and vapors may escape.

Accordingly, a need exists for an encapsulated horizontal filter construction including filter frames or plates which may be individually supported from the encapsulating structure and readily renewed or replaced when desired.

Examples of various forms of vertical and horizontal exposed filter constructions as well as vertical encapsulated filter constructions are disclosed in catalog No. 77 distributed by The Ertel Engineering Company of Kingston, New York.

BRIEF DESCRIPTION OF THE INVENTION

The filter construction of the instant invention comprises an elongated horizontal filter construction which is of the fully encapsulated type and yet which is constructed in a manner whereby the individual filter frames or plates may be readily removed and replaced, when desired. The filter construction includes an elongated upwardly opening tank having interconnected opposite side and end walls with a first stationary filter head mounted in one end of the tank and a second movable head mounted in the over end of the tank and adjustably shiftable toward and away from the first head for clampingly engaging a plurality of filter frames between the heads. The interior of the tank includes opposite side filter plate or frame supporting bars extending longitudinally thereof adjacent the upper marginal edges of the side walls of the tank and the various filter frames or plates to be clamped between the heads include support lugs slidably engaged with and supported from the bars. The shiftable head is movable toward the stationary head whereby the filter frames and plates may be clamped between the heads and the stationary head includes fluid inlet and outlet passages for admitting fluid to be filtered into the filter construction and allowing the flow of filtered material from the filter construction. The tank includes a downwardly opening cover and a support frame which swingably supports the cover from the tank for forward and downward swinging positions to close the tank and upward and rearward swinging to move the cover to an open position. The cover is supported from the frame for limited oscillation about a horizontal longitudinal axis and the opposite end walls of the tank include trapezoidal-shaped upper extensions and the end walls of the cover include complementary similar shape and size downwardly opening recesses in which the extensions are received when the cover is closed. The upper marginal edges of the opposite side and end walls of the tank include seal structure for forming a fluid-tight seal with the lower marginal edges of the side and end walls of the cover when the cover is in the closed position and the movable filter head is supported from the corresponding tank end wall through the utilization of a jack screw threaded through the tank end wall and which may therefore be manipulated from the exterior of the tank to increase or decrease the compression forces applied to the filter plates disposed between the heads within the tank. The lower portion of the tank includes a drain opening and the support frame for the cover and the tank have a pair of fluid cylinders operably connected therebetween for swinging the cover between the open and closed positions thereof.

The main object of this invention is to provide an encapsulated horizontally arranged multiplate filter construction whereby the filter plates or pads may be readily replaced and the filter construction may be utilized to filter fluids which must be contained.

Another object of this invention is to provide an encapsulated frame-type filter constructed in a manner whereby the individual filter plates thereof may be readily removed and replaced without utilization of a hoist.

A further object of this invention is to provide a filter construction in accordance with the preceding objects and which may have the filter plates thereof readily replaced in order that the filter construction may be utilized to filter different fluids.

A final object of this invention to be specifically enumerated herein is to provide a filter construction in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully herein after described and claimed, reference being had to the accompanying drawings forming a part hereof, wherein like numerals refer to like parts throughout.

BRIEF DESCRIPTION OF THE DRAWINGS

FIG. 3 is an enlarged vertical sectional view taken substantially upon the plane indicated by the section line 3—3 of FIG. 2;

DETAILED DESCRIPTION OF THE INVENTION

Figure 1:
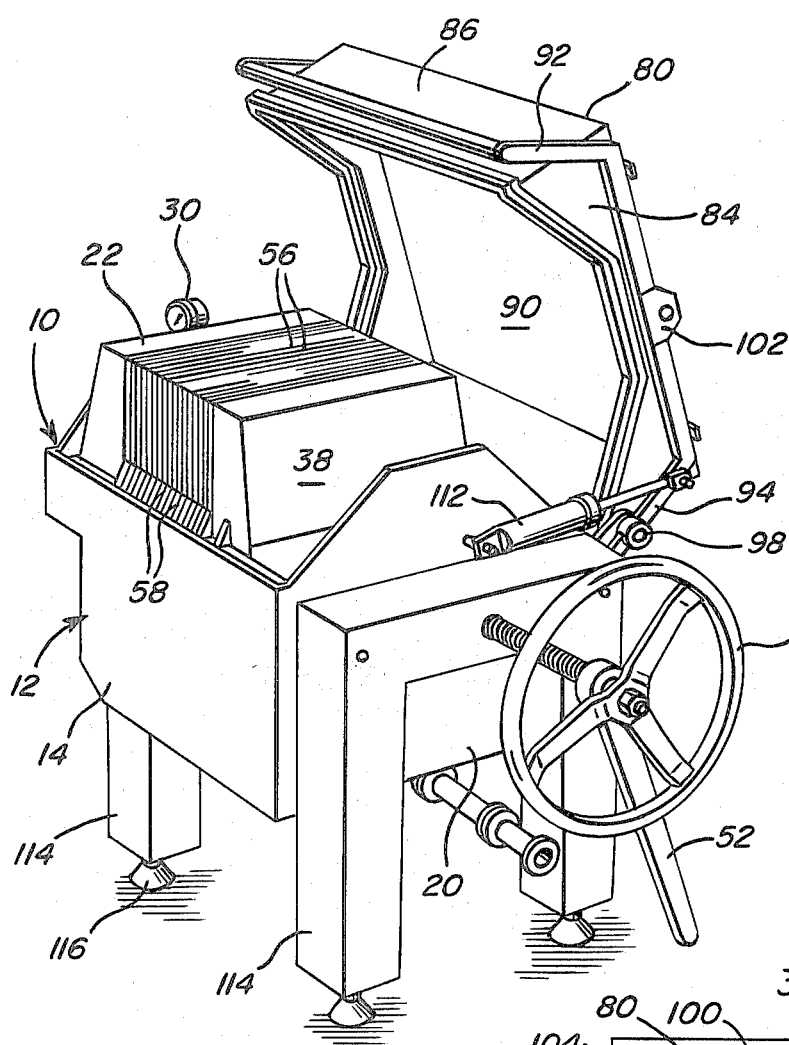
FIG. 1 is a perspective view of the filter construction of the instant invention.

Referring now more specifically to the drawings, the numeral 10 generally designates the encapsulated frame-type filter press of the instant invention. The press 10 includes a tank referred to in general by the reference numeral 12 including front and rear side walls 14 and 16 and opposite end walls 18 and 20. The end wall 18 includes includes a stationary head 22 having an inlet passage 24 opening therethrough equipped with a pressure gauge 26 exteriorly of the tank 12 and an outlet passage 28 opening therethrough equipped with a pressure gauge 30 and a stone filter 32 disposed exteriorly of the tank 12.

Figure 4:
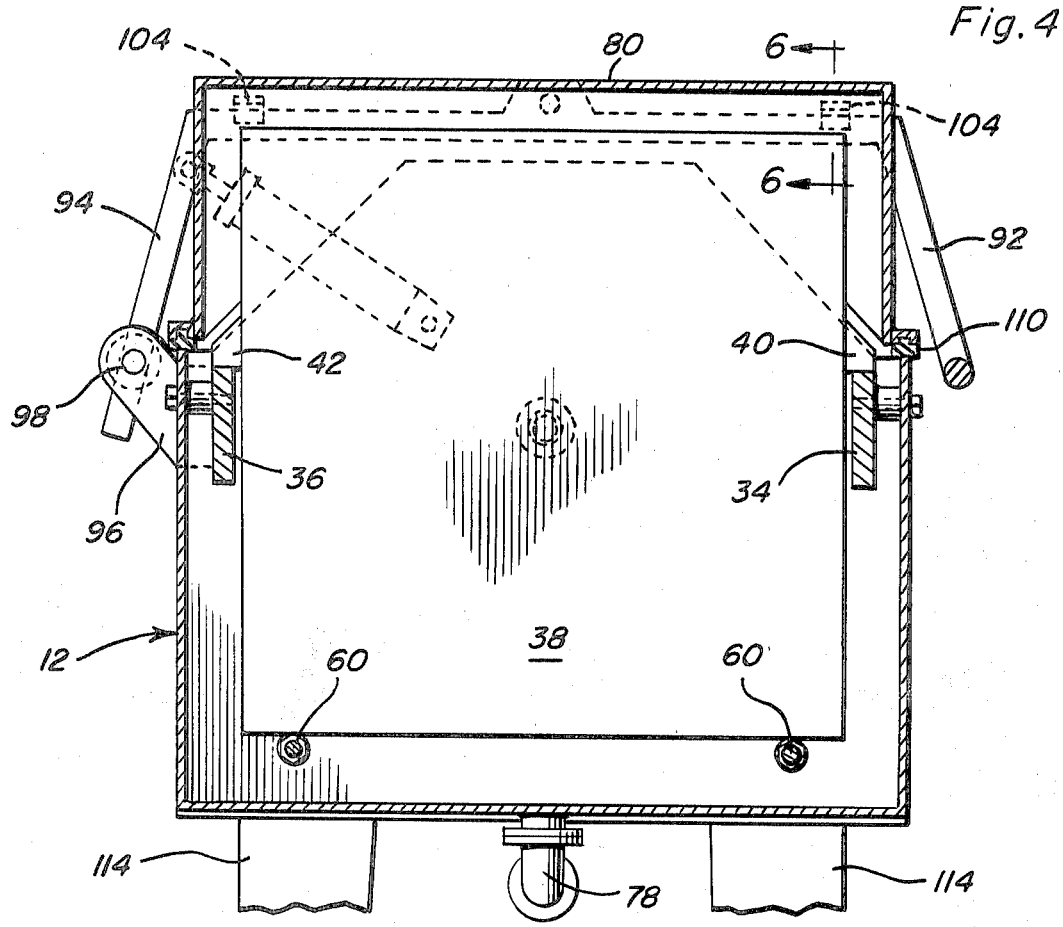
FIG. 4 is a transverse vertical sectional view taken substantially upon the plane indicated by the section line 4—4 of FIG. 3.
Figure 5:
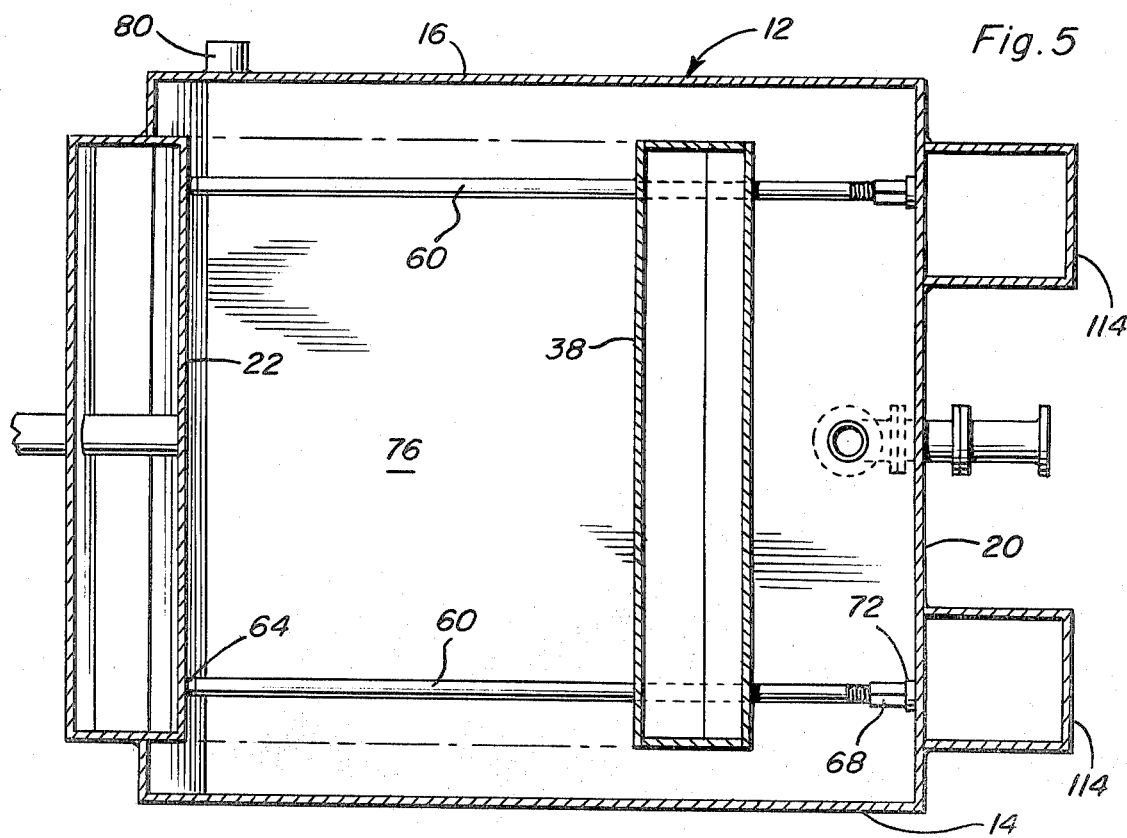
FIG. 5 is a horizontal sectional view taken substantially upon the plane indicated by the section line 5—5 of FIG. 3.

A pair of front and rear longitudinally extending support bars 34 and 36, see FIG. 4, are mounted within the tank 12 and extend between the end walls 18 and 20. A movable head 38 including opposite side support lugs 40 and 42 engaged with the support bars 34 and 36 is disposed within the tank 12 and is slidable along the bars 34 and 36. The end wall 20 includes a seal equipped threaded nut 44 secured therethrough and a clamp screw 46 is threaded through the nut 40 and includes a circular head 48 on its inner end journalled from the movable head 38. The outer end of the clamp screw 46 is provided with a hand wheel 50 and also a torque input lever 52 supported from the clamp screw 46 through the utilization of a reversible ratchet mechanism 54.

A plurality of filter plates 56 are provided and each filter plate 56 includes opposite side support lugs 58 corresponding to the support lugs 40 and 42. The filter plates 56 are disposed between the heads 22 and 38 and are also slidable along the support bars 34 and 36.

Figure 7:
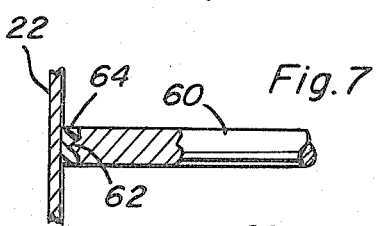
FIG. 7 is an enlarged fragmentary vertical sectional view illustrating the manner in which one end of one of the filter plate and support rods is supported within the tank.
Figure 8:
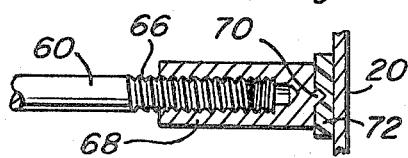
FIG. 8 is a fragmentary sectional view illustrating the manner in which the other end of the support rod of FIG. 7 is supported within the tank.

A pair of lower front and rear support rods 60 are supported within the lower portion of the tank 12 and each support rod 60 includes a center pointed tip 62 on one end abutted against a complementary-shaped seat 64 in turn abutted against the stationary head 22, see FIG. 7. The other end of each rod 60 is threaded as at 66 and threadedly engaged in a sleeve 68 including a central pointed tip 70 corresponding to tip 62 and seated in a complementary recess formed in an abutment 72 abutted against the end wall 20, see FIG. 8. Of course, each of the rods 60 may be rotated relative to the corresponding sleeve 68 in order to remove and install the rod 60 and to adjustably position the latter as desired. The rods 60 serve to support the filter panels 74 disposed between adjacent plates 56 before the filter panels 74 are snapped into position supported from the plates 56 when the filter panels 74 are being removed or replaced, see FIG. 3.

The bottom of the tank 12 is closed by a bottom wall 76 including a drain outlet 78 and the rear side wall 16 of the tank 12 includes a vapor outlet 80 disposed above the bottom wall 76 and to which a suitable discharge conduit for vapors may be connected.

The tank 12 includes a downwardly opening cover 80 including opposite end walls 82 and 84 and opposite front and side walls 86 and 88. The upper marginal edges of the walls 82, 84, 86 and 88 are interconnected by a top wall 90 and a generally U-shaped support frame 92 including a pair of free arm ends 94 is pivotally supported from a pair of brackets 96 carried by the rear side wall 16 as at 98, see FIG. 2. The longitudinal mid-portions of the arms 100 of the frame 92 include support brackets 102 from which pivot shanks 103 carried by the opposite end walls 82 and 84 of the cover 80 are oscillatably supported for angular displacement about a horizontal axis extending longitudinally of the tank 12. The end walls 82, 84 of cover 80 include front and rear abutments 104, see FIG. 2, abuttingly engageable with the corresponding arms 100 to limit oscillation of the cover 80 relative to the support frame 92.

Figure 2:
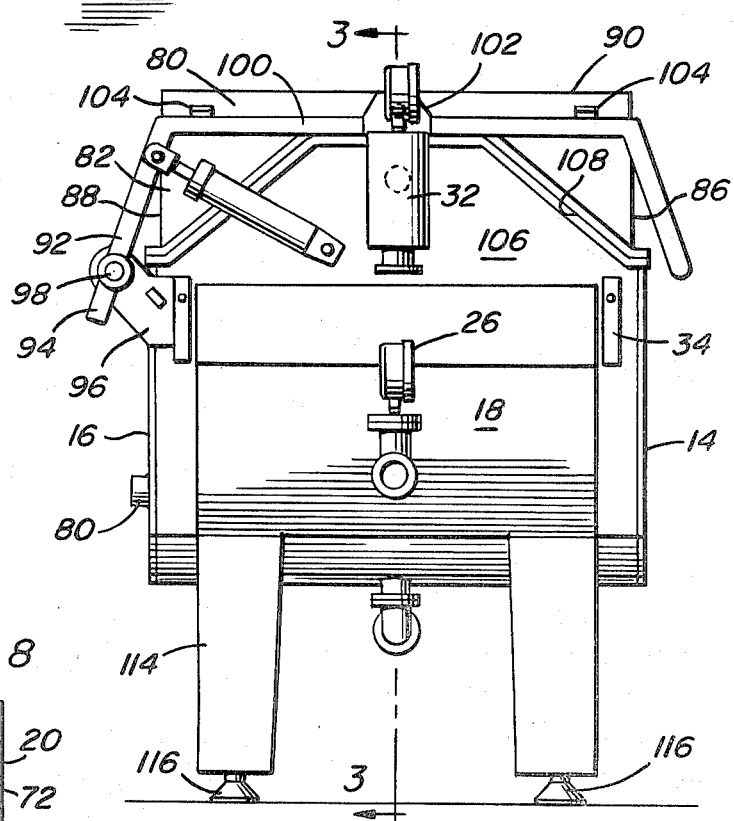
FIG. 2 is an enlarged end elevational view of the filter construction as seen from the left end thereof.
Figure 6:
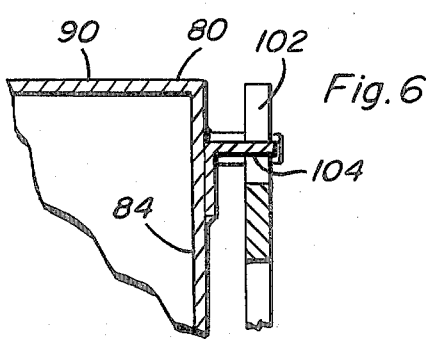
FIG. 6 is an enlarged fragmentary vertical sectional view taken substantially upon the plane indicated by the section line 6—6 of FIG. 4.

The opposite end walls 18 and 20 include upwardly projecting trapezoidal-shaped extensions 106 and the end walls 82 and 84 of the cover 80 include complementary recesses 108 formed therein in which the extensions 106 are seatingly received when the cover 80 is in the closed position thereof illustrated in FIG. 2. Further, the upper marginal edges of the walls 14, 16, 18 and 20 of the tank 12 includes seal structure 110 with which the lower marginal edges of the opposite side and end walls 82, 84, 86 and 88 are sealingly engageable when the cover 80 is in the closed position.

A pair of fluid (pneumatic) cylinders 112 are pivotally connected at one pair or corresponding ends to the extensions 106 and to the free arm ends 94 at their other pair of corresponding ends whereby the cylinders 112 may be actuated to open and close the cover 80.

The abutments 104 which limit oscillation of the cover 80 relative to the frame 92 insure against excessive oscillation of the cover relative to the frame 92 and yet allow sufficient oscillation of the cover 82 to insure proper seated engagement of the lower marginal edges of the opposite side and end walls of the cover with the seal or seal structure 110 carried by the tank.

The tank 12 includes depending legs 114 from whose lower ends threadedly adjustable feet 116 are supported and the hand wheel 50 may be tightened when initially installing the frame 56 and filter pad 74. After the cover 80 has been closed, the lever 52 may be actuated from the exterior of the filter press 10 by the application of a pre-determined amount of lateral force to the free end of the lever 52 whereby the movable head 38 will be properly "torqued" in operable position. Of course, the cylinders 112 may be replaced by hydraulic cylinders, or other means may be used to swing the frame 92 as required to open and close the cover 80.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An encapsulated frame-type filter press, said press including an upwardly opening tank having interconnected opposite side and end walls, a first stationary filter head mounted in one end of said tank, a second movable head mounted in the other end of said tank and adjustably shiftable toward and away from said first head, a plurality of alternating filter panels and filter frames releasably clamped between said heads, said first head including inlet and outlet passages formed therethrough for inlet and outlet flow of fluid to be filtered to and from said filter panels and frames, a downwardly opening cover for said tank including interconnected opposite side and end walls, the lower marginal set of edges of said cover side and end walls and the upper marginal set of edges of said tank side and end walls being positionable in juxtaposed relation for closing said tank, support means swingably supporting said cover from said tank for forward and downward swinging of said cover into position closing said tank and upward and rearward swinging of said cover toward and an open position with said cover upwardly and rearwardly displaced relative to said tank and disposed in a forwardly and downwardly opening attitude, one of said sets of edges including seal means for forming at least a generally fluid-tight seal with the other set of edges when said cover is in the closed position, said support means including a lift frame pivotably supported from said tank for oscillation relative thereto about a first horizontal axis extending longitudinally of said tank and stationary relative to said tank and frame, means supporting said cover from said frame for slight limited oscillation relative thereto about a second horizontal axis extending longitudinally of said tank, said end walls of said tank including generally isoclinal trapezoidal-shaped upper extensions and said end walls of said cover including complementary similar shape and size downwardly opening recesses in which said extensions are received when said cover is closed.

2. The combination of claim 1 including fluid cylinder means operatively connected between said tank and said lift frame for opening and closing said cover.

3. The combination of claim 1 wherein said tank includes a lower fluid drain outlet opening.

4. The combination of claim 1 wherein said tank includes opposite longitudinally extending support bars adjacent and inwardly of the upper marginal edges of said side walls, said frames including opposite side support lugs slidably engaged with and supported from said bars.

5. The combination of claim 4 wherein said movable head includes opposite side support lugs slidably engaged with and supported from said bars.

6. The combination of claim 1 wherein said tank includes lower opposite side longitudinally filter panel extending support rods, each of said support rods being adjustable in length, a pair of opposite end abutments supported from the opposite ends of each rod and abbutingly engageable with the inner-surfaces of the corresponding sidewalls of said tank.

7. The combination of claim 6 wherein said tank includes opposite longitudinally extending support bars adjacent and inwardly of the upper marginal edges of said side walls, said frames including opposite side support lugs slidably engaged with and supported from said bars.

8. The combination of claim 1 including means operatively connected between said tank and lift frame for swinging the latter between the open and closed positions of said cover.

* * * * *